(12) United States Patent
Kawanami

(10) Patent No.: US 7,116,502 B2
(45) Date of Patent: Oct. 3, 2006

(54) OPTICAL APPARATUS

(75) Inventor: Akihiro Kawanami, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/044,915

(22) Filed: Jan. 27, 2005

(65) Prior Publication Data
US 2005/0168835 A1     Aug. 4, 2005

(30) Foreign Application Priority Data
Jan. 30, 2004    (JP)    ............... 2004-024915

(51) Int. Cl.
| G02B 7/02 | (2006.01) |
| G02B 15/14 | (2006.01) |
| G03B 17/00 | (2006.01) |
| G03B 13/22 | (2006.01) |
| G03B 13/34 | (2006.01) |

(52) U.S. Cl. ............ 359/823; 359/696; 359/697; 396/87; 396/91; 396/93; 396/95; 396/131; 396/134; 396/135

(58) Field of Classification Search ........ 359/694, 359/823, 696–698; 396/55, 85, 87, 95, 91, 396/93, 96, 448, 227, 349, 129, 529, 131, 396/137, 133–135; 348/335, 345
See application file for complete search history.

(56) References Cited

U.S. PATENT DOCUMENTS

| 4,477,167 | A | * | 10/1984 | Ishikawa et al. ............ 396/134 |
| 4,537,487 | A | * | 8/1985 | Taniguchi et al. ............ 396/93 |
| 4,835,561 | A | * | 5/1989 | Matsui ..................... 396/93 |
| 4,908,647 | A | * | 3/1990 | Ueyama .................... 396/135 |
| 5,270,763 | A | * | 12/1993 | Ogasawara ................. 396/96 |
| 5,434,638 | A | * | 7/1995 | Ishibashi et al. ............. 396/95 |
| 5,448,295 | A | * | 9/1995 | Hirota ..................... 348/345 |
| 5,455,649 | A | * | 10/1995 | Yamada et al. .............. 396/87 |
| 5,574,535 | A | * | 11/1996 | Ogasawara ................. 396/95 |
| 6,301,441 | B1 | | 10/2001 | Kato |

FOREIGN PATENT DOCUMENTS

| JP | 2001-83397 A | 3/2001 |
| JP | 2001-83397 A5 | 3/2001 |

* cited by examiner

Primary Examiner—Loha Ben
(74) Attorney, Agent, or Firm—Morgan & Finnegan LLP

(57) ABSTRACT

An optical apparatus is disclosed which can control a position of a driven member with precision using a simple control algorithm. The optical apparatus includes an actuator, a driven member, a transmission mechanism for transmitting a driving force from the actuator to the driven member, a first detector for detecting driving of the actuator and for outputting a signal corresponding to a detection result, a second detector for detecting driving of the driven member and for outputting a signal corresponding to a detection result, and a controller for controlling the actuator, wherein the controller determines, after activating the actuator, one of the first and second detectors which the one outputs a signal corresponding to a predetermined driving amount earlier, and controls the actuator based on the signal from the one that has been determined.

8 Claims, 8 Drawing Sheets

OPTICAL APPARATUS

FIELD OF THE INVENTION

The present invention relates to an optical apparatus that detects drives of both an actuator and a driven member that is driven by the actuator, and controls the actuator based on the detection results.

BACKGROUND OF THE INVENTION

Japanese Patent Application, Publication No. 2001-83397 discloses an optical apparatus that includes an autofocus (hereinafter "AF" for short) lens, a first pulse encoder that detects a driving speed and driving amount of the AF lens, and a second pulse encoder that detects a driving speed of an AF actuator, wherein the optical apparatus controls the speeds based on an output from the second encoder when the AF actuator runs and accelerates, and based on an output from the first pulse encoder when the AF actuator decelerates and stops.

Such an optical apparatus includes a mechanism that transmits a driving force from the AF actuator to the AF lens, and the mechanism has a complicated mechanical structure composed of a gear, a focus ring, a manual focus ("MF") ring, etc. This mechanical structure would generate frictions, and the speed detection at one location causes the AF motor to stop or suddenly accelerate in response to a user's manual manipulation. A structure disclosed in the above reference rectifies this shortcoming, and stabilizes the AF action.

Current cameras usually have the AF function, and are required to provide a more precise AF and a shorter focusing time upon the subject.

The precise AF requires a precise encoder used to detect a position of a focus lens.

Nevertheless, the actuator actually drives the focus lens, and a transmission mechanism transmits a driving force applied by the actuator to the focus lens.

The transmission mechanism is configured to connect plural gears and generates backlashes and deflections, causing a difference between the actual driving speed of the actuator and the moving speed of the focus lens.

Therefore, the speed detecting location by the encoder greatly affects a stop position and driving speed of the focus lens. In other words, even though the encoder becomes precise, the accuracy of the stop position does not improve if the driving speed of the focus lens is unstable. A detailed description will now be given of this problem.

FIG. 10 shows a structure of a focus unit driving mechanism that uses a conventional actuator. The driving force of an actuator 130 is transmitted to a gear part 151a in a fixed-position rotating ring 151 via plural gears 131 to 134, and drives the fixed-position rotating ring 151. This force drives a focus unit 102 that is helicoidally connected to the fixed-position rotating ring 151; a focus lens (not shown) in the focus unit 102 moves and is focused upon the subject.

The encoder includes pulse plates 143 and 121, and photointerrupters 104 and 105. The pulse plate has holes at regular pitches in a rotational direction. The rotational amount and rotational speed are detectable by reading the light transmitting state and the light shielding state of the pulse plate using the photointerrupters.

The pulse plate 143 and 121 need a smaller hole pitch for improved position detecting accuracy of the focus unit 102. When the stop position of the focus unit 102 and the speed of the actuator 130 are controlled while the encoder is arranged at a position A in FIG. 10, mechanical looseness, deflections, deformations, etc. may slightly retard a transmission of the driving force of the actuator 130 to the focus unit 102.

In other words, when an output of the pulse plate 143 is detected and controlled at the position A, the rotational amount and rotational speed of the actuator 130 can be precisely detected. However, the detected rotational speed may not correspond to the moving speed of the focus unit 102. In this case, the actual focus unit 102's stop position scatters even when the actuator 130 is controlled to stop for each predetermined driving amount.

On the other hand, when the stop position of the focus unit 102 and the speed of the actuator 130 are controlled while this encoder is arranged at a position B in FIG. 10, the speed control is maintained without influence of the mechanical looseness, deflections, deformations, etc. until the driving force of the actuator 130 transmits to the focus unit.

However, when the actuator 130 is activated with large mechanical looseness (which is caused, for example, by backlashes among gears when the actuator is driven in a direction reverse to the last driving direction), the focus unit 102 does not move due to the mechanical looseness until the looseness is removed. The encoder starts detection after the focus unit starts moving.

In other words, due to no output at all from the encoder just after the actuator 130 is activated, the control accelerates the speed of the actuator 130. When the mechanical looseness is removed, the accelerated driving of the actuator 130 transmits to the focus unit 102 and might cause the moving speed of the focus unit 102 to exceed the predetermined target speed.

Conceivably, in an attempt for a slight driving, for example, this phenomenon would cause the focus unit 102's inertial force to move the focus unit 102 beyond the predetermined driving amount, even when the actuator 130 stops after the focus unit 102 moves by the predetermined amount. In other words, the precise control over the stop position of the focus unit 102 is not available.

One preferable solution for this problem is to arrange photointerrupters at both the positions A and B. However, the above control method that utilizes the speed detections at two positions requires the information of the current driving direction to be stored in a memory, for example, so that the control method can determine whether or not there is looseness in the next driving. In addition, switching of the speed detecting encoders between the positions A and B for the acceleration and the deceleration makes the control complicated disadvantageously.

Moreover, as to the detection accuracy of the driving amount, the accuracy of the output values relating to the driving amount may be worse than the usual one due to a hole pitch difference between the pulse plate 143 at the position A and the pulse plate 121 at the position B, and a relationship between a reducing ratio from the actuator 130 to the pulse plates 143 and 121 and a reducing ratio from the actuator 130 to the focus unit 102. It is therefore not necessarily the best method to switch the speed control based on the output from the encoder at the position A and the speed control based on the output from the encoder at the position B.

In addition, the detection accuracy of the driving amount would differ between DC and vibrating motors applicable to the actuator. This is because the DC motor generally rotates at a high speed with a low torque whereas the vibrating motor rotates at a low speed with a high torque. Therefore, for the same moving speed of the focus unit, use of the DC motor would require a larger reducing ratio and more gears in FIG. 10.

A description will be given of the stop position accuracy, for example, where the DC motor and the vibrating motor are used for the actuators for driving two lenses having approximately the same mechanical structure in driving force and moving speed of the focus unit. While these motors are connected to the pulse plates having the same hole pitch, the number of output pulses of the encoder is detected relative to the rotational amount of the fixed-position rotating ring. As a result, the lens that uses the DC motor has more output pulses due to the above relationship of the reducing ratio.

According to this structure, use of the DC motor would be able to detect a position of the focus unit with higher precision. Use of the vibrating motor as the actuator would provide a worse position detection accuracy than the DC motor due to the above relationship of the reducing ratio.

From this relationship, in order for the lens that uses the vibrating motor to obtain the same position detection accuracy as the lens that uses the DC motor, it is necessary to provide a reduction mechanism between the vibrating motor and the focus lens, and gears that increase the motor's speed between the vibrating motor and the pulse plate.

While a conceivable method might be to associate the speed-increased final gear with the pulse plate for improved stop position accuracy, it would hardly actually improve the position detecting accuracy of the focus unit, since the mechanical looseness increases between the vibrating motor and the pulse plate in addition to the increasing mechanical looseness between the vibrating motor and the focus unit.

Apparently, it is preferable to use two position detecting mechanisms to detect a position of the lens that uses the vibrating motor, i.e., one that omits the speed increasing mechanism by gears and the other that detects a position of the focus unit. In particular, the position detecting mechanism for the focus unit preferably uses a pulse plate having a smaller hole pitch for improved accuracy.

It is thus preferable to detect the position and speed at both the positions A and B in FIG. 10. However, the position detecting accuracy at the position B may be better due to the actuator and the mechanical structure.

In view of these mechanical structures, the speed control should select one of detection systems at two points based on the past and current states. This selection necessity complicates the control and requires a high-performance (or expensive) microcomputer.

BRIEF SUMMARY OF THE INVENTION

Accordingly, it is an exemplary object of the present invention to provide an optical apparatus that can control a position of a driven member with precision using a simple control algorithm.

An optical apparatus according to one aspect of the present invention includes an actuator, a driven member, a transmission mechanism for transmitting a driving force from the actuator to the driven member, a first detector for detecting driving of the actuator and for outputting a signal corresponding to a detection result, a second detector for detecting driving of the driven member and for outputting a signal corresponding to a detection result, and a controller for controlling the actuator, wherein the controller determines, after activating the actuator, one of the first and second detectors which the one first outputs a signal corresponding to a predetermined driving amount earlier, and controls the actuator based on the signal from the one that has been determined.

Other objects and further features of the present invention will become readily apparent from the following description of the preferred embodiments with reference to the accompanying drawings.

DETAILED DESCRIPTION OF THE PREFERRED EMBODIMENTS

Referring to the accompanying drawings, a description will be given of the preferred embodiment.

Figure 1:
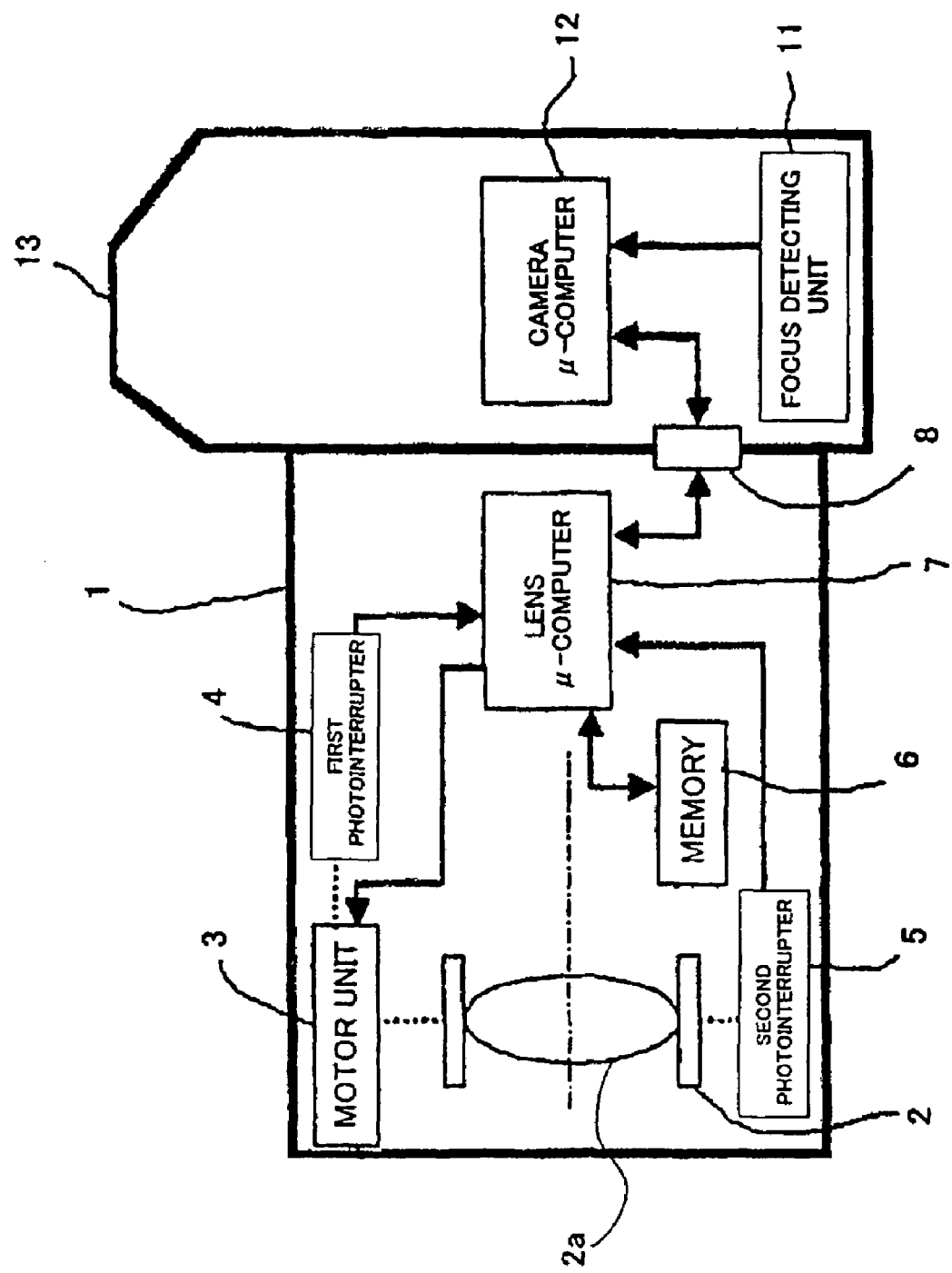
FIG. 1 is a schematic structure of an autofocus camera and an interchangeable lens according to one embodiment of the present invention.

FIG. 1 shows a structure of a single lens reflex camera to which an interchangeable lens (a lens unit) is attached as an optical apparatus according to one embodiment of the present invention.

In FIG. 1, 1 denotes an interchangeable lens having an imaging optical system. 2 denotes a focus unit (or a driven member) that has a focus lens 2a to be focused upon the subject. The focus lens 2a constitutes part of the imaging optical system.

Figure 2:
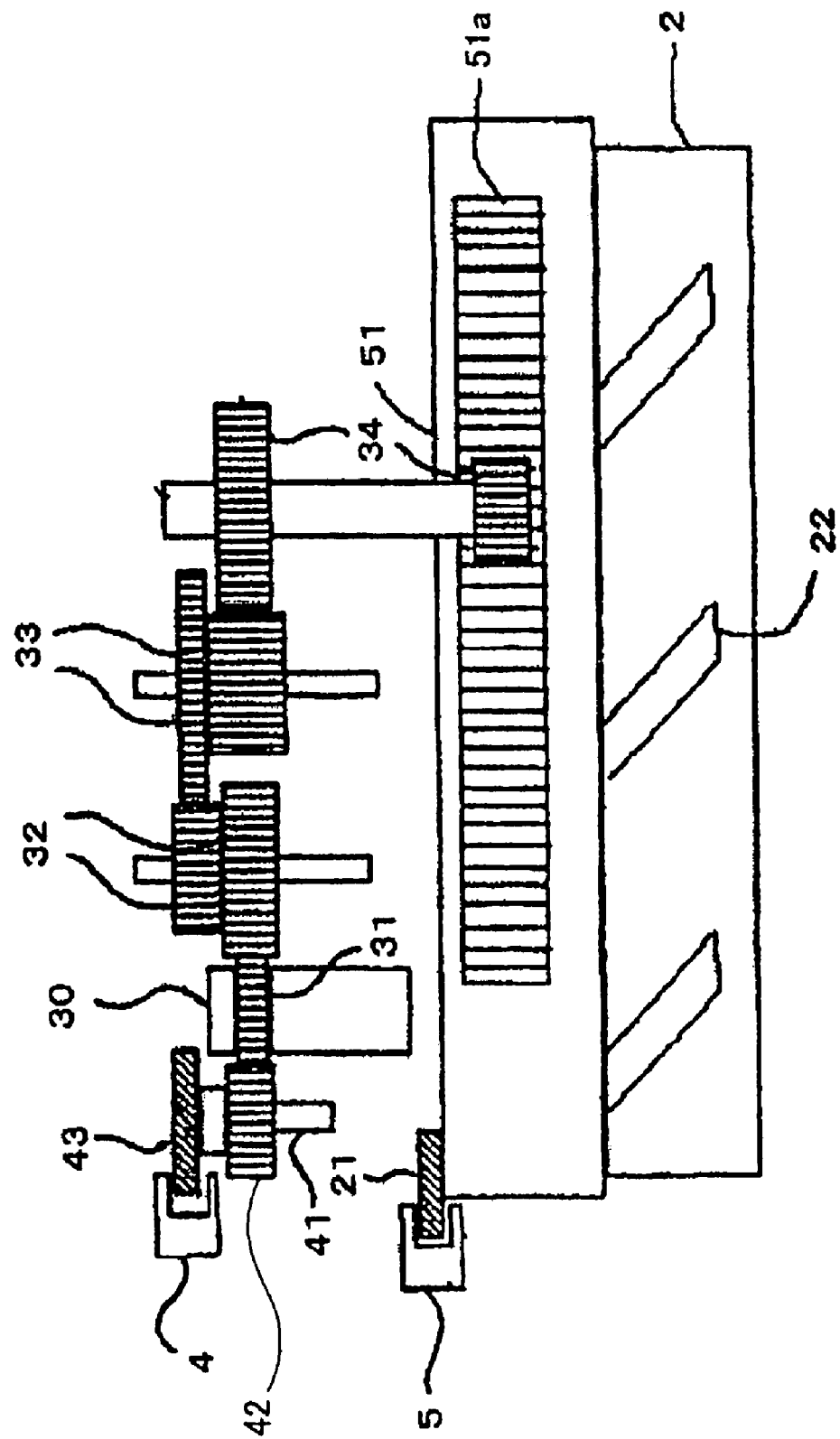
FIG. 2 is a view showing a driving mechanism of a focus unit in this embodiment.

3 denotes a motor unit, which includes, as shown in FIG. 2, a motor 30 (or an actuator) as a driving source of the focus unit 2, and plural gears 31 to 34 (transmission mechanism) that transmit the driving force of the motor 30 to the focus unit 2. The motor 30 may use, for example, a DC motor and a vibrating motor. The vibrating motor includes an oscillator that is excited by an electromechanical energy converter to which a frequency signal is applied, and a contactor that contacts the oscillator, wherein the oscillator and the contactor move relative to each other. The gears will be described later.

4 denotes a first detector that detects driving of the motor 30. 5 denotes a second detector that detects driving of the focus unit 2. These first and second detectors 4 and 5 will be discussed in detail later.

6 denotes a memory that previously stores various information relating to the interchangeable lens 1, and is implemented by an EEPROM, etc. This embodiment stores, in the memory 6, target speed data to be compared with speed related output values from the first and second detectors 4 and 5, and enables a lens microcomputer 7 to determine whether the current speeds obtained from the first and second detectors 4 and 5 are greater or smaller than the target speed data. The memory 6 also stores target values to be compared with the rotational amount of the motor 30 obtained from the first detector 4 and the moving amount of the focus unit 2 obtained from the second detector 5.

7 denotes a lens microcomputer, which governs all the controls of the interchangeable lens 1. The lens microcomputer 7 is equipped with a serial communication function, a timer counter function, an A/D function, a memory function, etc.

8 denotes a contact unit used for communications between the camera and lens. The contact unit 8 includes plural metal contact pins formed at the side of the camera 13, and plural contact plates that contact these contact pins and are provided at the side of the interchangeable lens 1.

The contact pins at the side of the camera 13 are connected to a power source terminal, a ground ("GND") terminal, an input terminal, an output terminal, and a synchronizing clock, etc.

11 denotes a focus detecting unit that detects a focusing state of the imaging optical system upon the subject. The camera microcomputer 12 provides the lens microcomputer 7 with a driving instruction of the focus unit 2 based on the output from this focus detecting unit 11. While the focus detecting method may use any one of a phase difference detecting method, a contrast detecting method, a total scanning method, and a distance measuring method, this embodiment uses the phase difference detecting method.

12 is a camera microcomputer that governs controls of the camera entirely. The camera microcomputer 12 communicates with the lens microcomputer 7, and calculates a driving amount and driving direction necessary to move the focus unit 2 to the focusing position based on an output from the focus detecting unit. 11.

13 denotes a camera (body), and includes a release switch (not shown) in addition to the above focus detecting unit 11 and the camera microcomputer 12. The imaging ready action (such as a focus adjustment action and a photometry action) starts in response to a first stoke manipulation of the release switch, and the imaging action starts in response to a second stroke manipulation. The camera 13 includes an image pickup device (not shown), such as a CCD sensor and a CMOS sensor, which forms, through its photoelectric conversion function, an image corresponding to a subject image formed by the imaging optical system, and records the image in a recording carrier (not shown), such as a semiconductor memory. Although the camera body 13 includes other various components, a description thereof will be omitted in this embodiment.

In FIG. 1, a solid-line arrow, a broken line, and an alternate long and short dash line indicate an electric connection, a mechanical connection, and an optical axis of the imaging optical system, respectively.

A description will now be given of operations of the camera 13 and the interchangeable lens 1. In response to the first stoke manipulation of the release switch in the camera 13, the camera microcomputer 12 outputs an activation instruction signal to the focus detecting unit 11. The following description will now assume that the focus detecting unit 11 detects a focal point in accordance with the phase difference detecting method.

The focus detecting unit 11 that has receive the activation instruction signal starts the focus detecting action in accordance with the phase difference detecting method, and outputs a detection result (including information on a defocus amount and direction) to the camera microcomputer 12. The camera microcomputer 12 sends the detection result to the lens microcomputer 7 via the contact unit 8. The lens microcomputer 7 operates a driving amount and driving direction from the current position of the focus unit 2 to the focus position based on the received focus detection result, and controls the motor 30 so that the motor 30 drives by a rotational amount corresponding to the operated driving amount.

Referring now to FIG. 2, a description will be given of a detailed structure of the motor unit 3.

The gears that serve as a transmission mechanism in the motor unit 3 include a gear 31 attached to an output shaft of the motor 30, and double gears 32, 33 and 34 that include large and small gears. The gear 31 is engaged with the large gear in the double gear 32, and the small gear in the double gear 32 is engaged with the large gear in the double gear 33. The small gear in the double gear 33 is engaged with the large gear in the double gear 34, and the small gear in the double gear 34 is engaged with a gear member 51a formed in a rotating ring 51.

The thus structured transmission mechanism transmits the driving force of the motor 30 to the focus unit 2 via the rotating ring 51. A male helicoids (not shown) is formed in an inner circumference of the rotating ring 51, and helicoidally connected to a female helicoids 22 formed in an outer circumference of the focus unit 2. Therefore, rotations of the rotating ring 51 are transmitted to the focus unit 2. Thereby, the focus lens 2a included in the focus unit 2 is driven in the optical-axis direction, and focused upon the subject.

The gear 31 attached to an output shaft of the motor 30 is also engaged with a gear 42 fixed onto a rotary shaft 41, and a pulse plate 43 is fixed onto a tip of the rotary shaft 41. Therefore, when the rotating force of the motor 30 is transmitted to the gear 42 and the gear 42 starts rotating, the pulse plate 43 starts rotating synchronously. The pulse plate 43 includes plural holes at regular pitches in its rotating direction.

The first detector 4 is arranged at a position corresponding to the hole in the pulse plate 43. The first detector 4 is made of a photointerrupter that includes a light projecting unit and a light receiving unit, and outputs a pulse signal whenever the light receiving unit receives the light from the light projecting unit through a hole in the pulse plate 43. The output pulse signal is input into the lens microcomputer 7.

The pulse plate 43 rotates together with the gear 42 that is engaged with the gear 31 fixed onto the output shaft of the motor 30. Therefore, the pulse signal from the first detector 4 is a signal output in accordance with the rotation or driving of the motor 30. Since the pulse plate 43's rotational amount and rotational speed correspond to the motor 30's rotational amount and rotational speed, the motor 30's rotational amount is detectable by counting the pulse signal from the first detector 4 and the motor 30's rotational speed is detectable from the number of counts of the pulse signal per unit hour.

Instead of the photointerrupter, the first detector 4 may use an electromagnetic hall device or a contact device that detects an electric contact with each of the electrodes arranged on the pulse plate at predetermined pitches along the rotating direction. The first detector 4 may include a circuit that counts the pulse signal, and outputs a signal corresponding to the count value, or a circuit that outputs a signal corresponding to a count value (or speed) of the pulse signal per unit hour.

The second detector 5 has a structure similar to that of the first detector 4, and is provided at a position corresponding to the pulse plate 21 provided in the rotating ring 51. The second detector 5 outputs a pulse signal in accordance with the rotations of the rotating ring 51. The output pulse signal is input into the lens microcomputer 7.

Since the rotating ring 51 is helicoidally connected to the focus unit 2, the focus unit 2's moving amount is detectable by counting the pulse signal from the second detector 5 and the focus unit 2's moving speed is detectable from the number of counts of the pulse signal per unit hour.

The pulse plate 21 does not have to be attached to the rotating ring 51, and may be configured to rotate with one of the gears (such as the double gear 33) for transmitting the rotating force of the motor 30 to the focus unit 2. The second detector 5 outputs a pulse signal in accordance with the rotation so as to detect the moving amount and the moving speed of the focus unit 2.

The current position of the focus unit 2 can be identified as the lens microcomputer 7 always monitors the output of the second detector 5.

The lens microcomputer 7 controls the voltage to be applied to the motor 30 so as to change the rotating direction and rotating speed of the motor 30, thereby changing the moving direction and moving speed of the focus unit 2.

When the motor 30 is a vibrating motor, the frequency-modulated voltage is applied to the motor 30.

When the motor 30 is activated, the gear 31 that is fixed onto the output shaft 30 starts rotating, and the driving force is transmitted to the focus unit 2 when the backlashes among the gears 31 to 34 and 51a are removed.

When the motor 30 runs and transmits its driving force to the gear 42 and the pulse plate 43 rotates, the first detector 4 outputs a pulse signal in accordance with driving of the motor 30 and supplies the signal to the lens microcomputer 7.

When the driving force of the motor 30 is transmitted to the focus unit 2 via the gears (31 to 34 and 51a) and the rotating ring 51, and the focus unit 2 starts moving, the second detector 5 outputs a pulse signal in accordance with driving of the focus unit 2 and supplies the signal to the lens microcomputer 7.

At this time, as discussed above, a time difference occurs between an output form the first detector 4 and an output from the second detector 5 due to a difference in the resolution (detection accuracy) determined by the mechanical looseness amount the hole pitches in the pulse plates 43 and 21.

Accordingly, at the drive starting time (activation time) of the motor 30, this embodiment determines one of the first and second detectors 4 and 5, which the one outputs a signal corresponding to a predetermined driving amount earlier, and controls the speed of the motor 30 based on the pulse signal from the determined detector.

In this embodiment, an output of "a signal corresponding to a predetermined driving amount" means that a predetermined number of leading and trailing edges of the pulse signal (or changes of the signal values), and "a predetermined number" is set to three and stored in the memory 6 in advance.

Figure 3:
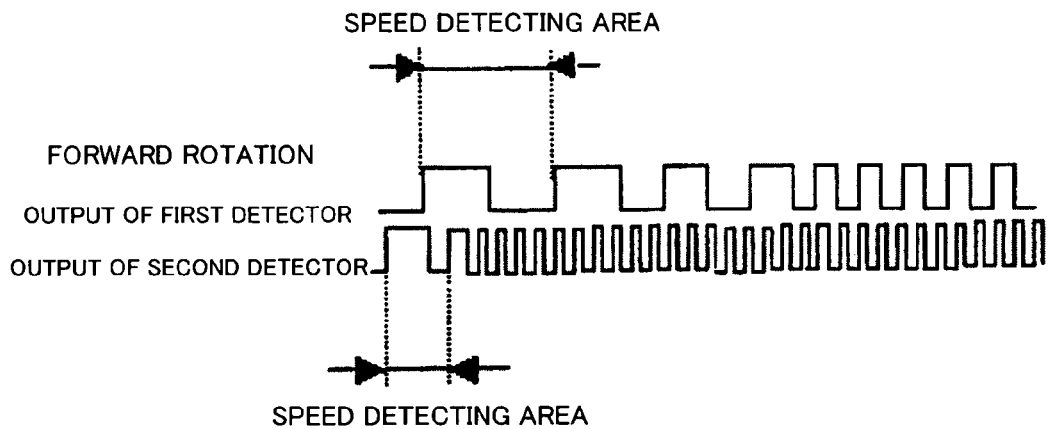
FIG. 3 is a timing chart of an output waveform of a photointerrupter with no backlashes.
Figure 4:
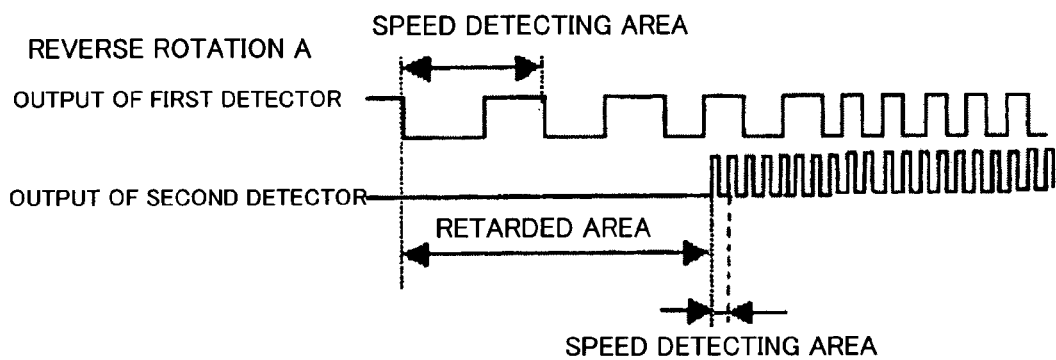
FIG. 4 is a timing chart of an output waveform of the photointerrupter with the backlashes.
Figure 5:
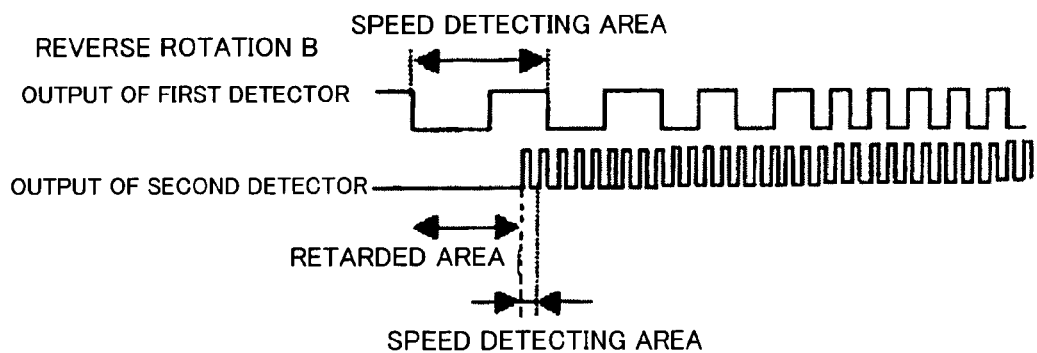
FIG. 5 is a timing chart of an output waveform of the photointerrupter with the backlashes less than those in FIG. 4.

Referring now to FIGS. 3 to 5, a description will be given of the control method of the motor 30 by the lens microcomputer 7. Here, FIG. 3 is a timing chart of the outputs from the first and second detectors 4 and 5 when the motor is activated and there are little backlash among gears in the motor unit 3 and little mechanical looseness in the focus unit 2. The output timing of the signal shown in FIG. 3 is seen, for example, when the focus unit 2 is driven in the same direction as the last moving direction of the focus unit 2.

In this case, as shown in FIG. 3, the first and second detectors 4 and 5 output the pulse signals simultaneous with the activation of the motor 30. When "a predetermined number" is set to three, the output value from the second detector 5 changes three times prior to the output value the first detector 4. The subsequent control over the motor 30's speed is based on the output from the second detector 5.

FIG. 4 is a timing chart of the outputs from the first and second detectors 4 and 5 when the motor is activated and there are backlashes among gears 31 to 34 and 51a in the motor unit 3 and mechanical looseness in the focus unit 2. The output timing of the signal shown in FIG. 4 is seen, for example, when the focus unit 2 is driven in a direction reverse to the last moving direction of the focus unit 2.

In this case, as shown in FIG. 4, the output value from the first detector 4 changes three times prior to the output value the second detector 5. The subsequent control over the motor 30's speed is based on the output from the first detector 4.

Since the gear 31 attached to the output shaft of the motor 30 is engaged with the gear 42 that rotates together with the pulse plate 43, the rotational force of the motor 30 is transmitted to the pulse plate 43 without the transmission mechanism (i.e., gears). Therefore, the pulse plate 43 immediately starts rotating when the motor 30 start driving. On the other hand, since the rotating force of the motor 30 is transmitted to the focus unit via the transmission mechanism (i.e., double gears 32 to 34 and 51a), the transmission of the driving force needs time due to the mechanical looseness and the backlashes among the gears.

Therefore, a change of the output value from the first detector 4 corresponding to the pulse plate 43 appears later than a change of the output value from the second detector 5 corresponding to the pulse plate 21.

FIG. 5 is a timing chart of the first and second detectors 4 and 5 when the motor is activated and there are backlashes among gears in the transmission mechanism and mechanical looseness in the focus unit 2, but the backlashes and mechanical looseness are less than those in FIG. 4. The output timing of the signal shown in FIG. 5 is seen, for example, when the speed at the time of stop is unstable in the last driving.

In this case, as shown in FIG. 5, approximately simultaneous with the activation of the motor 30, the first detector 4 outputs the pulse signal and then the second detector 5 outputs the pulse signal shortly after the motor is activated. If the first detector 4 has a higher resolution than that of the second detector 5, an output value from the second detector 5 first changes three times.

Therefore, the subsequent speed control of the motor 30 is based on the output of the second detector 5. One conceivable factor that causes the insufficient amounts of the looseness in the focus unit 2 and the backlashes in the motor unit 3 is, for example, a mismatch between the control and the load torque to the focus unit 2 different from the initial specification as a result of that a user prevents the movement of the focus unit 2 (e.g., when the user manually holds the manual manipulation ring connected to the focus unit 2, drops the interchangeable lens 1, and strongly grips and deforms the interchangeable lens 1).

In this way, the position accuracy of the focus unit 2 scatters according to conditions, such as the last driving direction and the last state at the stop time, predictions of the looseness and backlashes due to the specification changes, and a difference in resolution between the detectors 4 and 5.

The control algorism would be complex if the lens microcomputer 7 determines the condition, selects one of the first and second detectors 4 and 5 based on the determination result, and controls the speed of the motor 30 based on the output signal from the selected one of the detectors.

On the other hand, this embodiment neither stores nor determines the last driving direction and the state at the stop time. This embodiment determines one of the detectors which the one outputs the pulse signal corresponding to the predetermined driving amount earlier after the motor runs, and controls the speed of the motor 30 based on the output signal from the determined one. Therefore, the control algorism is maintained simple, reducing scattering of the positional accuracy of the focus unit 2.

As discussed, since the EEPROM as the memory 6 has stored "a predetermined number" of signal changes corresponding to the "predetermined driving amount", the value can be changed for each interchangeable lens. This configuration can, for example, always provide stable speed control even when the mechanical looseness amount scatters among plural interchangeable lenses of the same time (or even when there are individual differences).

A value of "a predetermined number" is preferably set to three or greater since the speed detection requires at least three changes of the output value.

This is because the duty ratio of the pulse output varies if the pitches between the holes (light transmitting parts) and the light shielding parts scatter in the pulse plates 43 and 21, and it is thus necessary to read the pulse output of an output changing amount for at least one period. While this embodiment stores a value of the "predetermined number" in the memory 6, it may be stored in a memory (not shown) in the lens microcomputer 7.

The "predetermined number" can differ between the first and second detectors 4 and 5, thereby providing stable speed control even when the resolution greatly changes between both the detectors 4 and 5.

For example, when the second detector 5 has a high resolution whereas the first detector 4 has a low resolution in FIG. 4, the speed control can rough the resolution in the timer counter in the lens microcomputer 7 and calculate an average speed in ten output value changes. In this case, if the "predetermined number" relative to the first detector 4 is made ten similar to the second detector 5, the speed detection delays and the motor 30 rotates too fast since the output value from the first detector 4 changes ten times.

This problem can be dissolved, for example, by setting the "predetermined number" relative to the second detector 5 to ten and by setting the "predetermined number" relative to the first detector 4 to three, shortening the time period within which it is ready to detect the speed based on the output from the first detector 4.

When each of the first and second detectors 4 and 5 reaches the "predetermined number" simultaneously, or in other words if it is impossible to determine one of output changes from the detectors which the one reaches the "predetermined number" earlier, it is preferable to control the speed of the motor 30 based on the output signal from the second detector 5.

This is because if the speed control is based on the output signal from the first detector 4, the configuration diverts from the original purpose of improving the positional accuracy of the focus unit 2, since the second detector 5 has a lower resolution than the first detector 4 and the finer speed control of the motor 30 is unavailable.

It would be conceivable for this reason that the speed control of the motor 30 is always based on the output signal from the second detector 5. In this case, the first detector 4 may be omitted. However, when the mechanical looseness retards the output from the second detector 5, the motor 30 rotates too high when the focus unit 2 moves minutely; even when the focus unit 2 is attempted to stop after the driving force is transmitted to the focus unit 2, the focus unit 2 passes the target stop position. In other words, the stop position accuracy of the focus unit 2 cannot improve unless both of the first and second detectors 4 and 5 are provided.

Thus, the lens microcomputer 7 controls the speed of the motor 30 based on the output signal from the detector whose output value first changes predetermined times. More specifically, the motor 30's rotation is controlled so that the its rotational speed can be the target speed that has been previously stored in the memory 6 or the memory (not shown) in the lens microcomputer 7. When the first and second detectors 4 and 5 have the same resolution, only one target speed of the motor 30 corresponding to the target speed of the focus unit 2 may be stored. On the other hand, when both the detectors have different resolutions, it is necessary to store information on two target speeds corresponding to these detectors.

Figure 6:
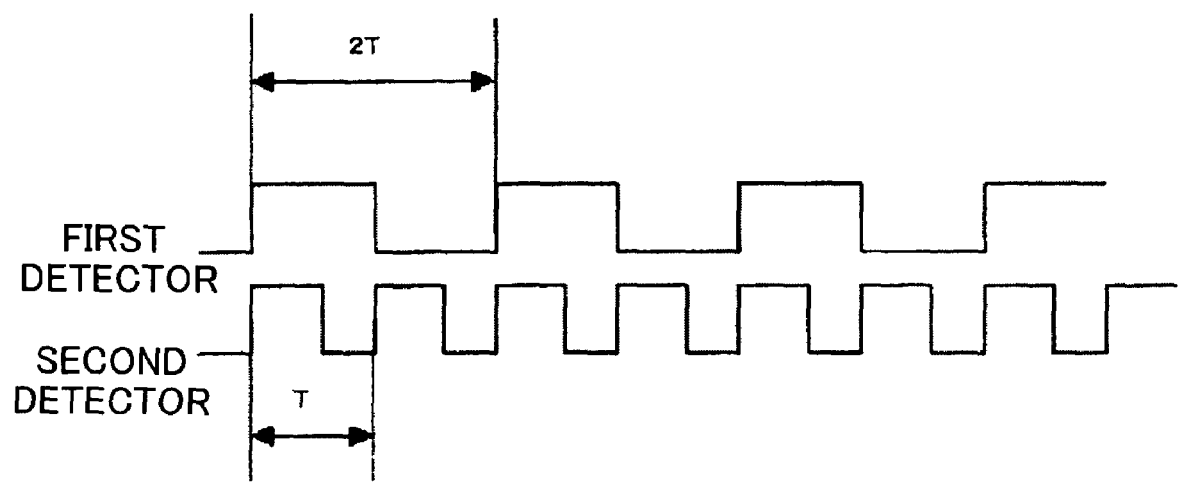
FIG. 6 is a timing chart showing an output waveform of the photointerrupter when a ratio of a detecting amount between the first and second detectors is set to the n-th power of 2, where n is an integer.

FIG. 6 is a timing chart showing a relationship between the pulse signal output from the first detector 4 and the pulse signal output from the second detector 5 as a result of driving of the motor 30. In this case, a period 2T of the pulse signal output from the first detector 4 is twice as long as a period T of the pulse signal output from the second detector 5. For the speed control of the motor 30, the target speed information is roughly divided into the constant speed time and the reduced speed time. The target speed information at the constant speed time is minutely classified according to the sensitivity of the focus lens. The sensitivity is a ratio between a moving amount of focusing relative to a moving amount of the focus lens, and changes according to zooming positions (such as a focal distance). For example, in a zooming lens having a focal distance of 70 mm to 200 mm, when the sensitivity at the time of 70 mm is defined as 2, the sensitivity of 200 mm becomes about 8.16 ($=(200/70)^2$). Since the normal lens makes the moving amount of focusing always constant, the focus lens's moving speed delays as the sensitivity increases. Thus, the target speed information is minutely classified and stored if the sensitivity varies.

In order to separately store these two pieces of speed information, the memory 6 and the memory (not shown) in the lens microcomputer 7 need a large storage capacity. When one of the two types of speed information is selected which corresponds to the detector for the speed control and processed by operations, the operation takes a long time and the control delays.

Accordingly, when a ratio between the number of outputs of the pulse signal from the first detector 4 and that from the second detector 5 is set to a n-th power of 2, where n is an integer as shown in FIG. 6, only one type of speed information can provide fast speed control with easy operations no matter which detector is used.

For example, suppose that the second detector 5 outputs pulses of the n-th power of 2 where n is an integer, such as $2^1=2$ pulses (see FIG. 6), $2^2=4$ pulses, $2^3=8$ pulses, ..., during one period of an output of the first detector 4. If the speed information relative to the second detector 5 stored in the lens microcomputer 7 is 1 msec/1 pulse, the speed information output from the second detector 5 can be directly compared with the already stored speed information as 1 msec/1 pulse for the speed control based on the output from the second detector 5.

When the lens microcomputer 7 stores the speed information of 1 msec/1 pulse for the second detector 5 and the speed control is based on the first detector 4, the time period corresponding to one period of an output from the first detector 4 is 1 msec×2=2 msec, if a ratio between the number of outputs of the pulse signal from the first detector 4 and that from the second detector 5 is set to $2^1$. Similarly, the time period is 1 msec×4=4 msec if the ratio is set $2^2$, and the time period is 1 msec×8=8 msec if the ratio is set $2^3$. The speed control is available by comparing these values with the actual speed information obtained from the first detector 4.

Notably, when a ratio between the number of outputs of the pulse signal from the first detector 4 and that from the second detector 5 is set to the n-th power of 2 where n is an integer, the lens microcomputer 7's operation becomes very simple. For example, when 1 msec is stored as 1000, the lens microcomputer 7 uses the hexadecimal notation such as 03E8Hex. For 2 msec (2000), 03E8Hex is shifted by one bit in the left direction.

One bit shift of 03E8Hex in the left direction results in 07D0Hex, or 2000 in the decimal notation. Similarly, the operations end by a 2-bit shift in the left for 4 msec, and by a 3-bit shift in the left for 8 msec. Almost all the microcomputers have the bit shift function, and the bit shift is several tens as fast as the multiplication.

Thus, when a ratio between the number of outputs of the pulse signal from the first detector 4 and that from the second detector 5 is set to the n-th power of 2 where n is an integer, the data amount to be stored in the memory 6 or the memory in the lens microcomputer 7 is reduced irrespective of two detectors 4 and 5 and the operation speed becomes so fast that the easy and prompt speed control is available.

When the motor 30 is driven by a predetermined rotational amount, the number of pulses output may be made equal between the first and second detectors 4 and 5. In other words, the resolutions of the first and second detectors 4 and 5 may be equalized to each other.

When the lens microcomputer 7 determines that the focus unit 2 has stopped at the target position, the lens microcomputer 7 stops electrifying the motor 30 and terminates focusing. While the lens microcomputer 7 may execute parallel processing, such as stop control, camera shake compensation control, etc., a description thereof will be omitted in this embodiment.

Figure 7:
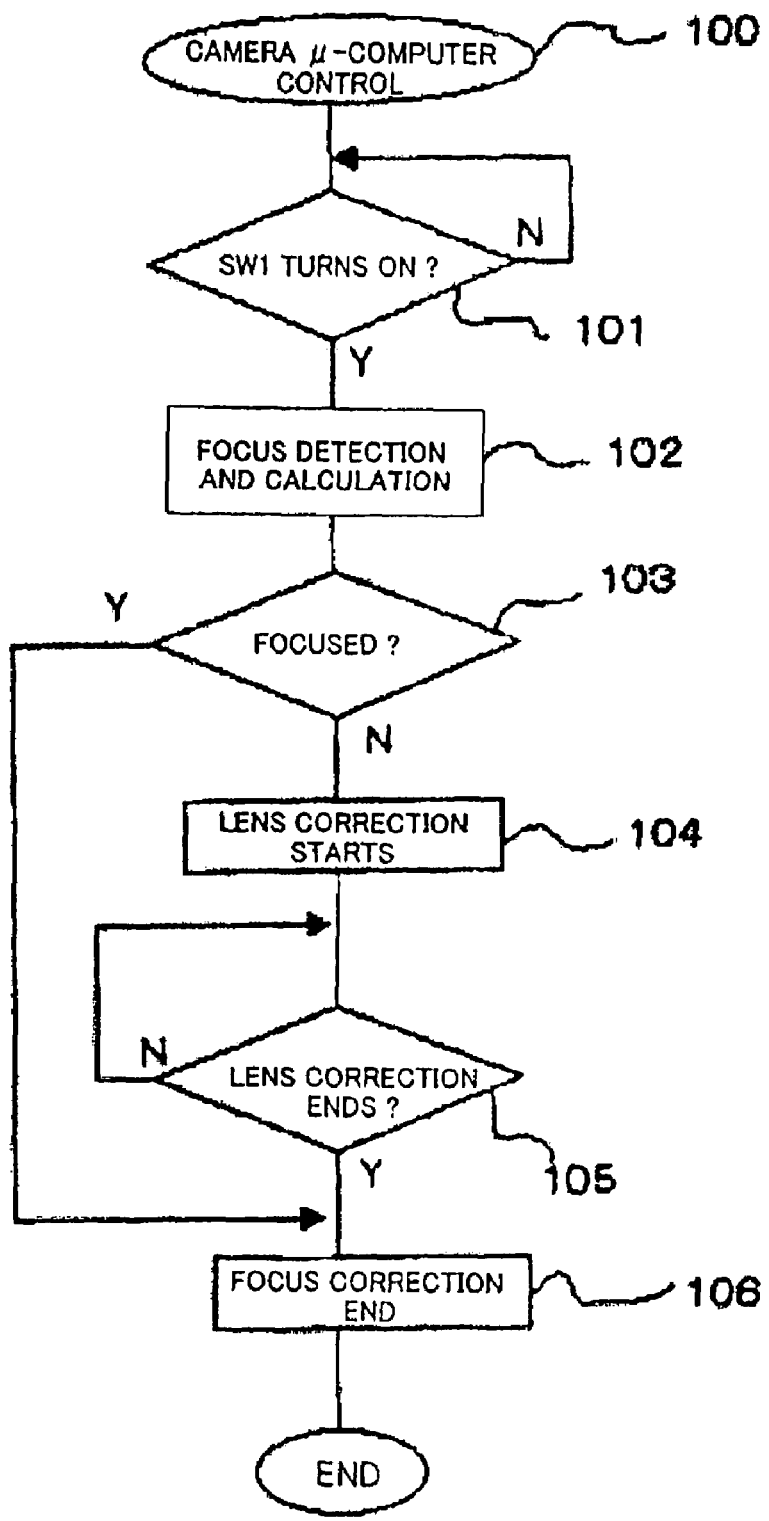
FIG. 7 is a control flow of a camera microcomputer in this a flowchart of a control procedure embodiment.

FIG. 7 is a flowchart of the AF related process by the camera microcomputer 12.

(Steps 100 and 101 (S is an Aberration of "Step" in FIG. 7)

The camera microcomputer 12 determines whether there is a first stroke manipulation of the release button (not shown) (which is expressed by "SW1 ON" hereinafter). The procedure moves to Step 102 in response to SW1 ON, and the procedure moves to Step 100 when the release button has not yet pressed.

(Step 102)

In response to SW1 ON, the camera microcomputer 12 outputs the signal that instructs the focus detecting unit 11 to start a focus detecting action. In accordance with this signal, the focus detecting unit 11 starts the focus detecting action. The camera microcomputer 12 operates the driving amount and driving direction of the focus unit 2, and sends the operational result to the lens microcomputer 7.

(Step 103)

The lens microcomputer 7 calculates the drive target position of the focus unit 2 based on the received driving amount and driving direction of the focus unit 2, compares the drive target position with the current position of the focus unit 2, and sends the result to the camera microcomputer 12. The camera microcomputer 12 determines that the lens is focused upon the subject when the drive target position accords with the current position, and the procedure moves to Step 106 so as to terminate the AF action.

(Step 104)

When Step 103 determines that the drive target position does not accord with the current position (or the lens is not focused upon the subject), the camera microcomputer 12 sends a drive signal to the lens microcomputer 7 so as to move the focus unit 2 to the drive target position and correct the lens. At this time, the communicated data includes information on the above focus detection result and status data used to instruct the lens microcomputer 7 to correct the lens.

(Step 105)

When the lens microcomputer 7 ends driving of the focus unit 2 (or a correction of the lens), the lens microcomputer 7 informs the camera microcomputer 12 of the fact as status information. The camera microcomputer 12 confirms the status information of the lens, and waits for the end of the lens correction.

(Step 106)

When Step 105 determines that the camera microcomputer 12 ends the lens correction, the camera microcomputer 12 sends the status information of prohibiting the lens correction to the lens microcomputer, terminating the lens correction process.

Figure 8:
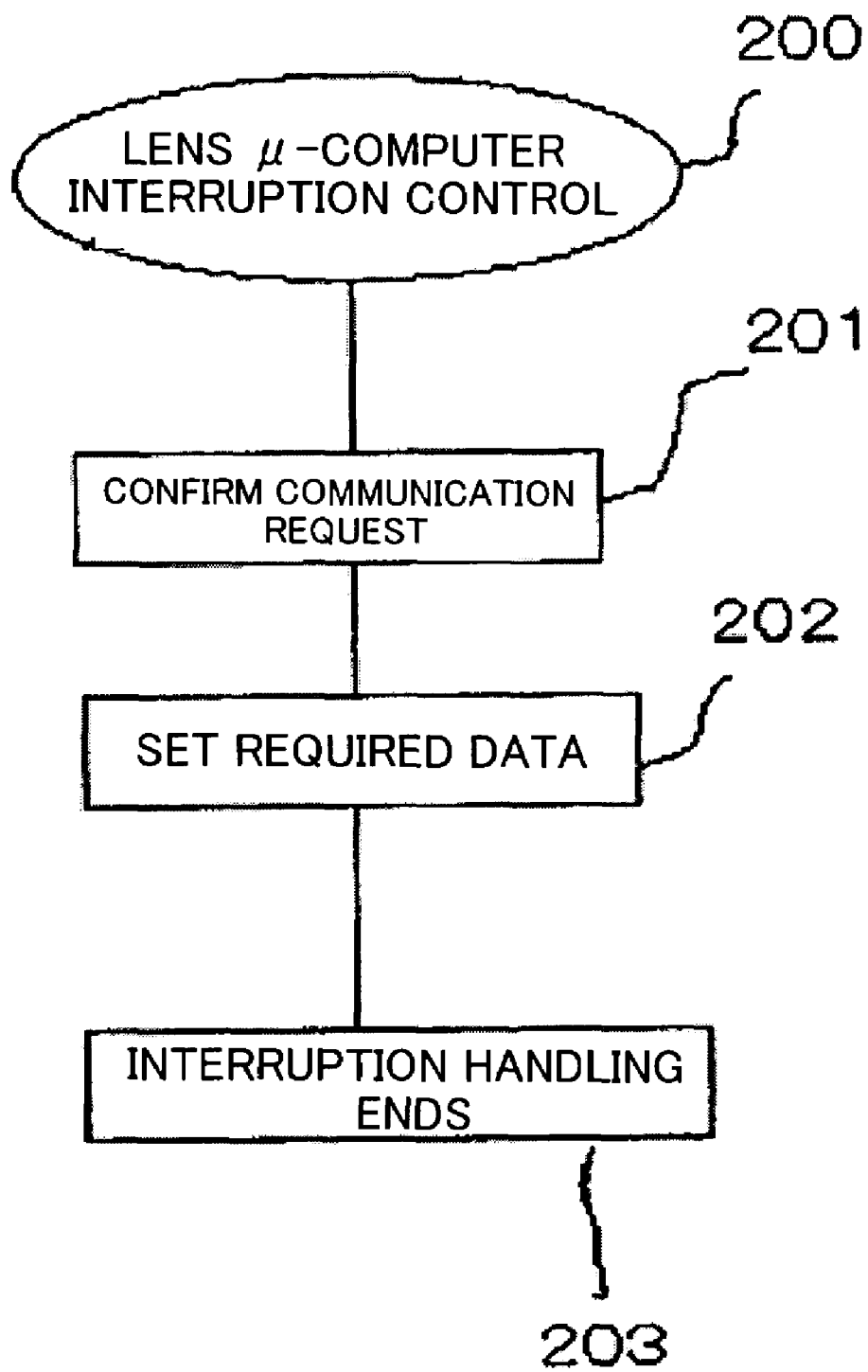
FIG. 8 is a control flow of a lens microcomputer in this embodiment.

FIG. 8 shows a flowchart relating to the communication interruption process by the lens microcomputer 7.

(Steps 200 and 201)

First, the lens microcomputer 7 determines, when receiving a communication from the camera microcomputer 12, whether or not the communication data from the camera microcomputer 12 is command data, and confirms the type of the command data. The command data is code data indicative of a request from the camera microcomputer 12 to the lens microcomputer 7, and the lens microcomputer 7 determines a request from the camera by analyzing this code data.

The command data to be analyzed by the lens microcomputer 7 includes a moving permission command of the focus unit 2, a stop command of the focus unit 2, a transmission request of optical information (such as a focal distance, FNo., and lens status information), a receipt request of the focus detection information, etc.

(Step 202)

The lens microcomputer 7 analyzes the command data and sends data necessary for the camera microcomputer 12. When the command data received from the camera microcomputer 12 is status information of the lens, the lens microcomputer 7 determines whether the focus unit 2 is currently moving or stops, and sends the result as the status information transmission data to the camera microcomputer 12.

This status information is sent to the camera microcomputer 12 when the lens microcomputer 7 receives the next communication from the camera microcomputer 12. When the command data received from the camera microcomputer 12 is a receipt request of the focus detecting information, the lens microcomputer 7 receives the focus detecting information in the next communication, and stores it in the internal memory (not shown).

(Step 203)

The interruption process end when the command analysis through communications with the camera microcomputer 12, settings of the data, and transmission processes end.

Figure 9:
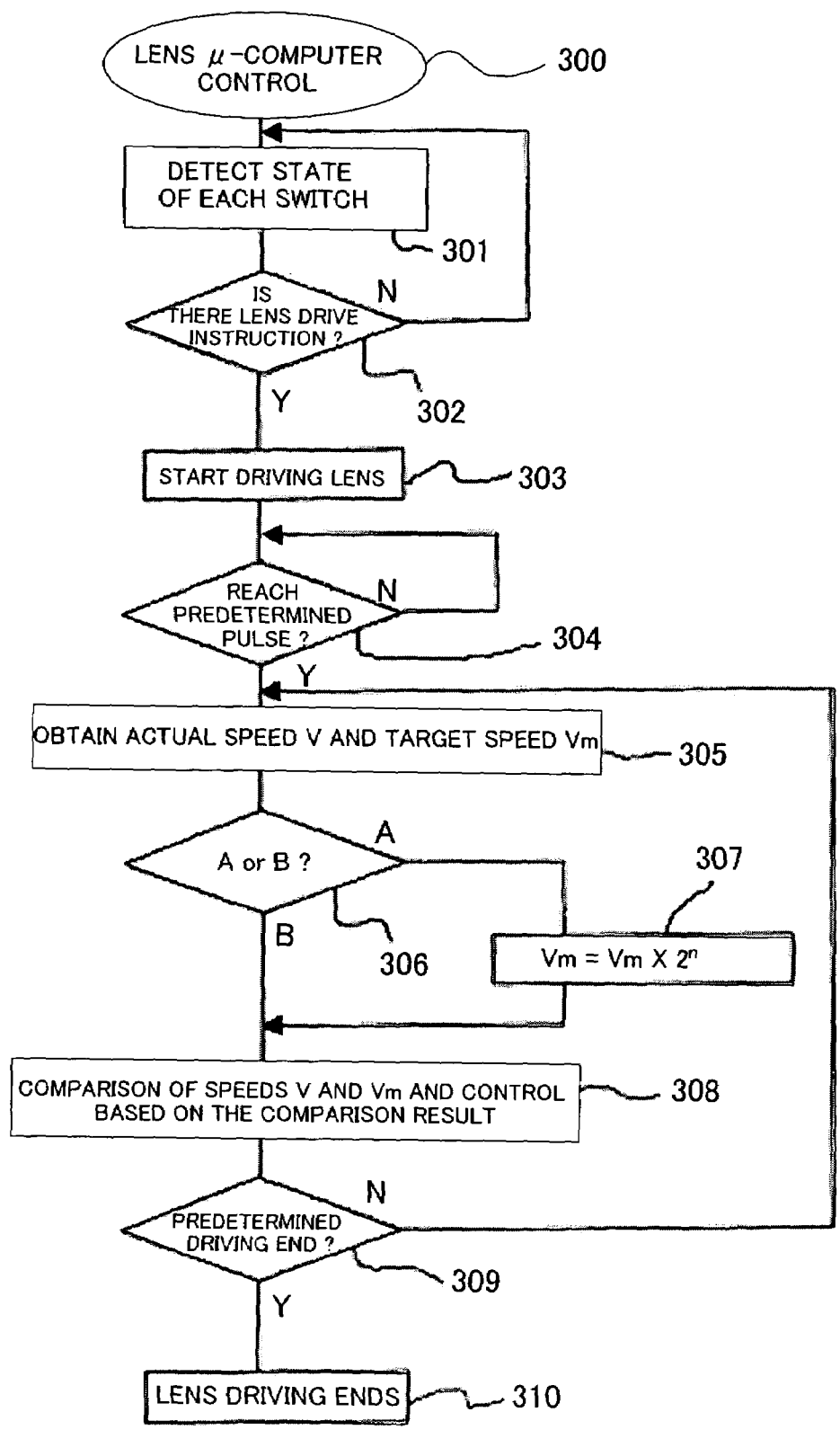
FIG. 9 is a control flow of a lens microcomputer.
Figure 10:
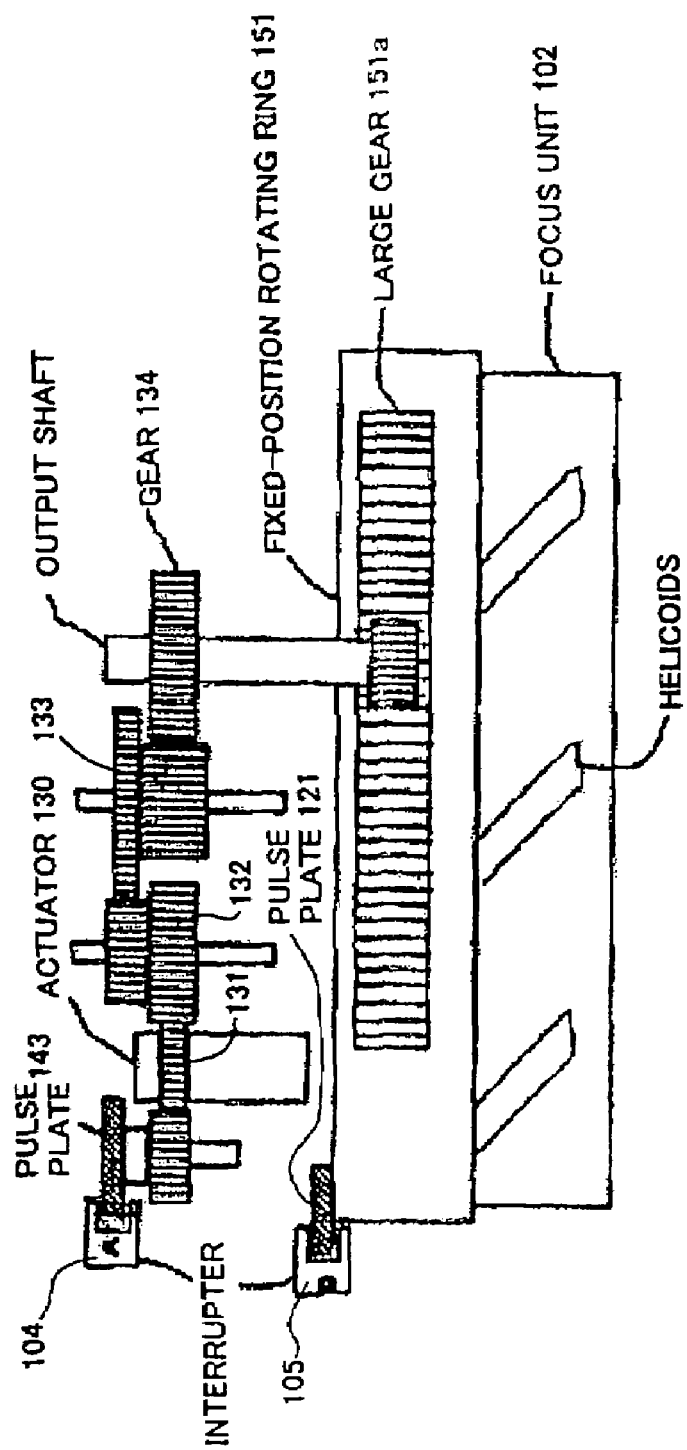
FIG. 10 is a view showing a driving mechanism of a conventional focus unit.

FIG. 9 is a flowchart of a control program relating to moving of the focus unit 2 in the lens microcomputer 7.

(Step 300 and 301)

When the interchangeable lens 1 is attached to the camera 13, the power is supplied to the lens microcomputer 7 from the camera 13 via the contact unit 8. Thereby, the lens microcomputer 7 first executes the reset process. When this reset process ends, the lens microcomputer 7 detects statuses of the switches (not shown) attached to the lens 1, and stores the information in the internal memory. The switches, as used herein, include a switch that switches two operational modes, e.g., an AF mode and a MF mode, and a switch that turns on and off the camera shake compensation.

(Step 302)

The lens microcomputer 7 and the camera microcomputer 12 transmit and receive information from each other via the contact unit 8. The lens microcomputer 7 determines whether the camera microcomputer 12 has sent the lens correction permission information (or the lens driving command). When the correction permission information has not yet been sent, the procedure returns to Step 301, and detects the statuses of the switches again. The communication from the camera microcomputer 12 is processed by the interruption control of the lens microcomputer 7 shown in FIG. 8, and the necessary information (such as the lens correction permission information) is stored in the memory in the lens microcomputer 7 by the interruption process.

(Step 303)

When Step 302 determines that the camera microcomputer 12 has sent the lens correction permission information, the lens microcomputer 7 immediately starts driving the motor 30. The motor 30's driving amount and driving direction for the focus unit 2 have been previously operated based on the focus detecting information from the camera microcomputer 12, as discussed above.

At this time, the lens microcomputer 7 sets an on-movement flag and informs the camera microcomputer 12 that the focus unit 2 is moving. The camera microcomputer 12 confirms that the focus unit 2 is moving by this information.

(Step 304)

The lens microcomputer 7 reads the outputs from the first and second detectors 4 and 5, and is on standby until the number of output changes from one of the detectors reaches the "predetermined number". The "predetermined number" is at least three as discussed above.

(Step 305)

When Step 304 determines that the output from one of the first and second detectors 4 and 5 changes predetermined times, previously stored target speed information (Vm) corresponding to the output of the second detector 5 is transferred to the memory in the lens microcomputer 7. Also, speed information (V) from one of the detectors which has first reached the predetermined times is transferred to the memory in the lens microcomputer 7. When the outputs from both of the detectors 4 and 5 simultaneously change a predetermined number of times, the speed information (V) form the second detector 5 is transferred to the memory in the lens microcomputer 7.

(Step 306)

The lens microcomputer 7 determines which detector reaches the predetermined number first in Step 304. The procedure moves to Step 307 when it is the first detector 4, and to Step 308 when it is the second detector 5.

(Step 307)

Since physical quantities of the target speed information Vm and the actual speed V are different from each other, these speeds cannot be directly compared with each other. Accordingly, as discussed above, when a ratio between the number of outputs of the pulse signal from the first detector 4 and that from the second detector 5 is set to 1 to $2^n$ (where n is an integer), the target speed information Vm becomes $Vm \times 2^n$ and the lens microcomputer 7 shifts Vm in the left direction n times. This manipulation can set the target speed information to a value corresponding to the output from the first detector 4.

(Step 308)

The lens microcomputer 7 compares the actual speed V with the target speed Vm, and changes the voltage to be applied to the motor 30 for the speed control so that the actual speed V approaches to the target speed Vm.

(Step 309)

The actual moving amount of the focus unit 2 is compared with the moving amount operated in Step 303 based on the information of the focus detecting result sent from the camera microcomputer 12. When these moving amounts accord with each other, the procedure moves to Step 310, and otherwise moves to Step 305.

(Step 310)

The lens microcomputer 7 stops the motor 30, clears the on-movement flag, and informs the camera microcomputer 12 that the focus unit 2 stops. When receiving this information, the camera microcomputer 12 determines that the focus unit 2 reaches the focus position and moves to the next action.

This embodiment controls the actuator (motor) based on one of the first and second detectors which the one outputs a signal corresponding to the predetermined driving amount earlier, and eliminates the necessity to determine which detector is to be used to control the actuator when there are looseness in the transmission mechanism, and a difference in resolution between the first and second detectors. Thereby, this embodiment simplifies the control algorism and reduces the cost.

In addition, this embodiment is applicable to other optical apparatus in addition to the interchangeable lens, such as a lens integrated camera, a video camera, and a copier.

This application claims foreign priority benefits based on Japanese Patent Application No. 2004-024915, filed on Jan. 30, 2004, which is hereby incorporated by reference herein in its entirety as if fully set forth herein.

What is claimed is:

1. An optical apparatus comprising:
   an actuator;
   a driven member;
   a transmission mechanism for transmitting a driving force from said actuator to said driven member;
   a first detector for detecting a driving amount of said actuator and for outputting a signal corresponding to a detection result;

a second detector for detecting a driving amount of said driven member and for outputting a signal corresponding to a detection result; and a controller for controlling said actuator, wherein said controller determines, after activating said actuator, one of said first and second detectors which outputs a signal corresponding to a predetermined driving amount earlier, and controls said actuator based on the signal output from the determined detector.

2. An optical apparatus according to claim 1, wherein said driven member is an optical unit that includes a lens.

3. An optical apparatus according to claim 1, wherein said controller controls said actuator based on the signal from said second detector if said controller cannot determine the one.

4. An optical apparatus according to claim 1, wherein the predetermined driving amount includes a first predetermined driving amount that is set for said first detector and a second predetermined driving amount that is set for said second detector and is different from the first predetermined driving amount.

5. An optical apparatus according to claim 1, wherein a ratio between the number of outputs of the signal from said first detector and the number of outputs of the signal from said second detector is an n-th power of 2 where n is an integer.

6. An optical apparatus according to claim 1, wherein each of said first and second detectors outputs a pulsed signal, and the number of pulses is the same between said first and second detectors for the same driving amount of said actuator.

7. An optical apparatus according to claim 1, wherein each of said first and second detectors outputs a pulsed signal, and the number of pulses output from said second detector is more than that from said first detector for the same driving amount of said actuator.

8. An optical apparatus according to claim 1, wherein said actuator is a vibrating motor that includes:

an oscillator that is excited by an electromechanical energy converter to which a frequency signal is applied; and a contactor that contacts said oscillator, wherein said oscillator and the contactor move relative to each other.

* * * * *

UNITED STATES PATENT AND TRADEMARK OFFICE
CERTIFICATE OF CORRECTION

PATENT NO. : 7,116,502 B2 Page 1 of 1
APPLICATION NO. : 11/044915
DATED : October 3, 2006
INVENTOR(S) : Kawanami It is certified that error appears in the above-identified patent and that said Letters Patent is hereby corrected as shown below:

In Column 5, Line 42, "stoke" should be --stroke--;

In Column 5, Line 59, "stoke" should be --stroke--;

In Column 9, Line 1, "algorism" should be --algorithm--;

In Column 9, Line 13, "algorism" should be --algorithm--;

In Column 10, Line 54, unbold "2" to imply the number 2 and not drawing item 2;

In Column 10, Line 59, unbold "2" to imply the number 2 and not drawing item 2;

In Column 11, Line 15, unbold "2" to imply the number 2 and not drawing item 2.

Signed and Sealed this

Twenty-seventh Day of March, 2007

JON W. DUDAS
*Director of the United States Patent and Trademark Office*